United States Patent [19]
Glance

[11] 3,811,698
[45] May 21, 1974

[54] STRUCTURE FOR A MOTOR VEHICLE

[75] Inventor: Patrick M. Glance, Plymouth, Mich.

[73] Assignee: Ford Motor Company, Dearborn, Mich.

[22] Filed: Mar. 29, 1972

[21] Appl. No.: 239,062

[52] U.S. Cl.......... 280/106 R, 293/DIG. 3, 213/1 A
[51] Int. Cl............................................ B62d 27/04
[58] Field of Search .................. 280/106 R, 106 T; 293/DIG. 3, 1, 63, 60; 213/1 A; 267/136, 182; 188/1 C

[56] References Cited
UNITED STATES PATENTS

| | | | |
|---|---|---|---|
| 3,412,628 | 11/1968 | DeGain | 293/DIG. 3 |
| 3,511,345 | 5/1970 | Takamatsu et al. | 213/1 A |
| 3,547,463 | 12/1970 | Eggert | 280/106 R |
| 3,437,367 | 4/1969 | Blank | 293/1 |
| 3,520,550 | 7/1970 | Dysarz et al. | 280/106 R |

*Primary Examiner*—Philip Goodman
*Assistant Examiner*—John A. Carroll
*Attorney, Agent, or Firm*—Clifford L. Sadler; Keith L. Zerschling

[57] ABSTRACT

A frame structure for the chassis of a motor vehicle having a construction designed to absorb kinetic energy by plastic deformation of the frame components. The frame has longitudinally extending side rails with fluted lower edges in side elevational view. When an impact load is exerted against the end of the frame assembly, the side rails will collapse by bending at each flute in a progressive manner to absorb the energy of the impact.

12 Claims, 5 Drawing Figures

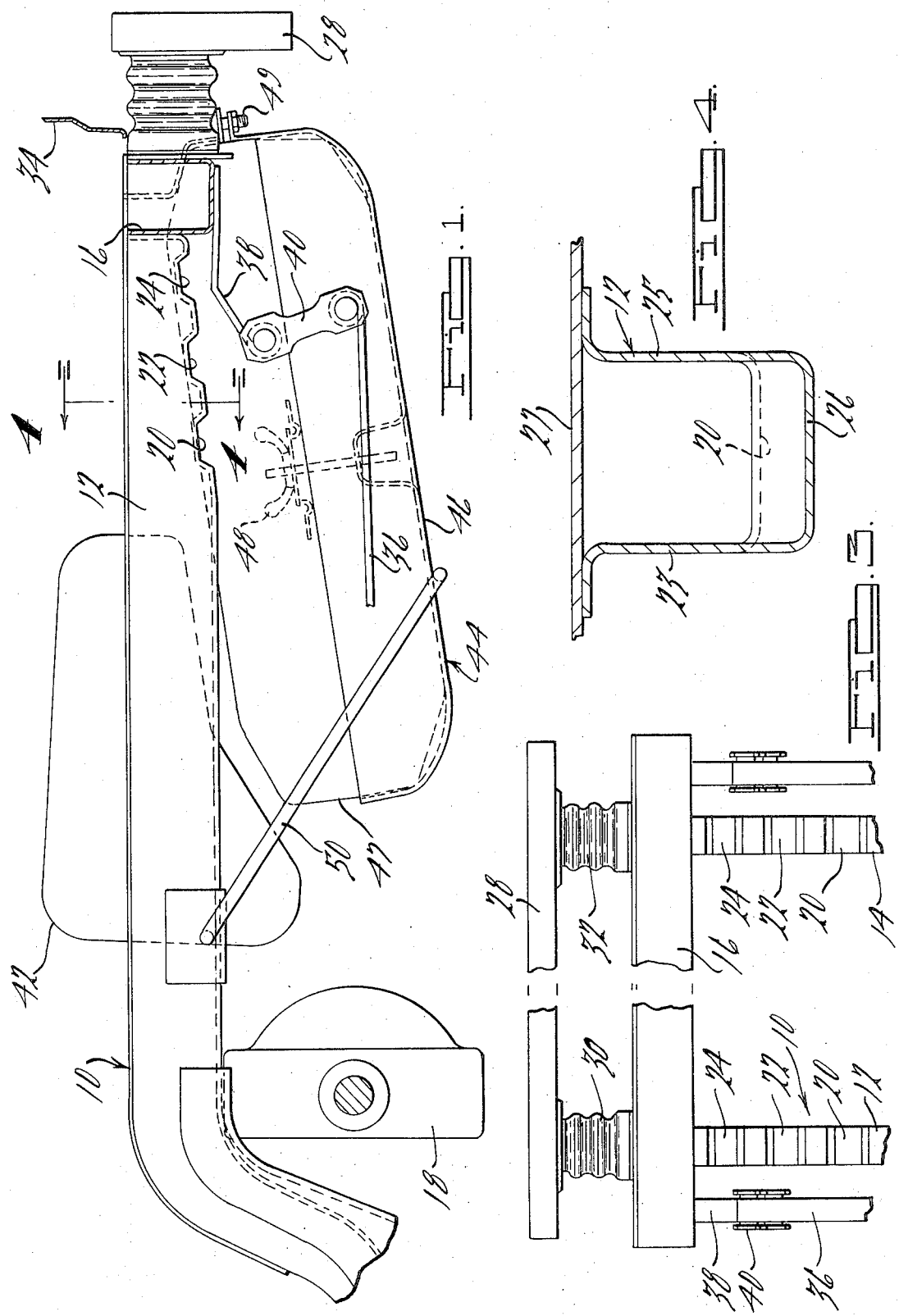

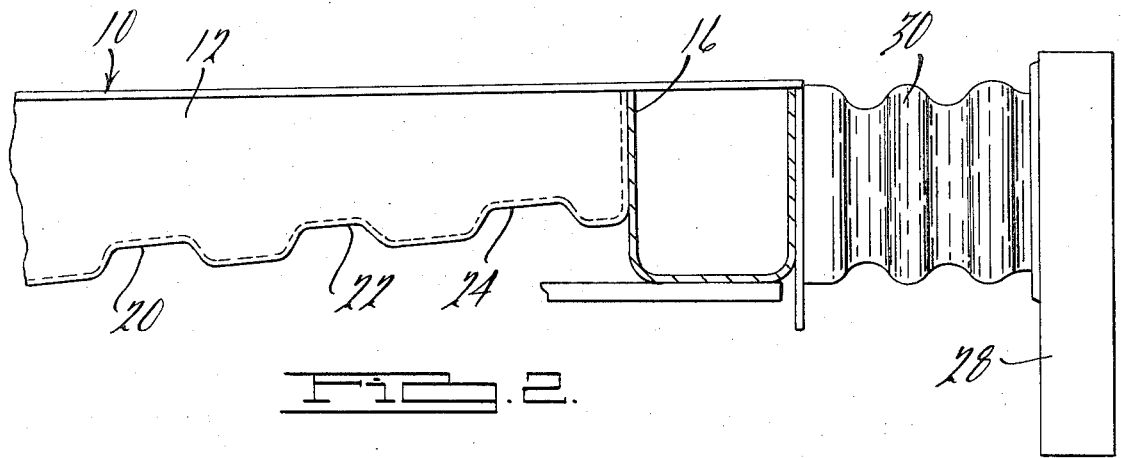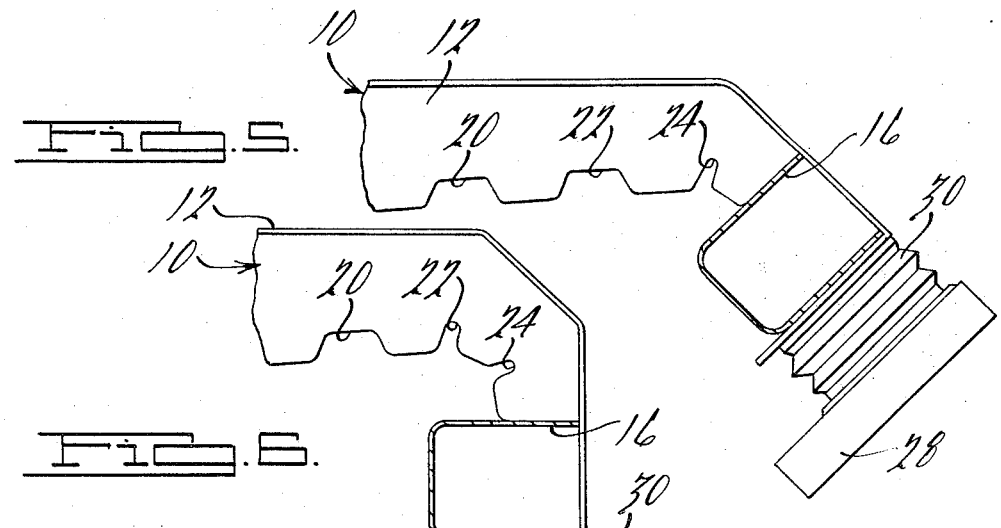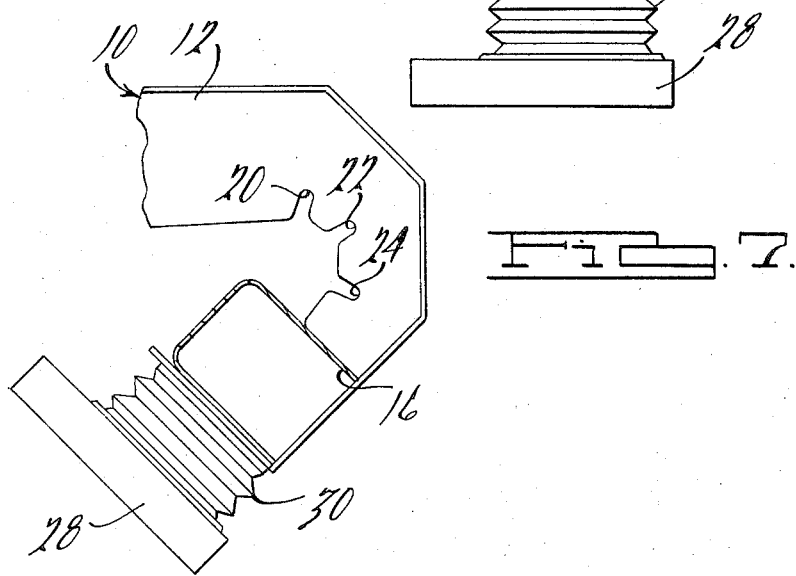

STRUCTURE FOR A MOTOR VEHICLE

BACKGROUND OF THE INVENTION

The present invention relates to chassis frames for motor vehicles, and more particularly to frames that are designed to absorb kinetic energy by the controlled collapse or plastic deformation of frame components.

BRIEF SUMMARY OF THE INVENTION

The present invention is directed toward a collapsible frame structure for a motor vehicle that absorbs the kinetic energy of an impact load. The invention provides a vehicle frame assembly having longitudinally extending side rail members. Each rail has a fluted or scalloped lower edge that provides sections of localized reduced bending strength. When an impact load is exerted against the ends of the rail members, they will buckle at each flute in a progressive manner. The kinetic energy of the impact will be absorbed as each rail assumes a scorpioid shape.

BRIEF DESCRIPTION OF THE DRAWINGS

The many objects and advantages of the present invention will become apparent upon consideration of the following detailed discussion and the accompanying remarks, in which:

FIG. 1 is a side elevational view of a portion of a motor vehicle having a chassis frame assembly constructed in accordance with this invention;

FIG. 2 is an enlarged side elevational view of a portion of the frame assembly of FIG. 1;

FIG. 3 is a bottom plan view of the chassis frame of FIG. 1;

FIG. 4 is a sectional view taken along section line 4—4 of FIG. 1; and

FIGS. 5, 6 and 7 are side elevational views of the frame structure illustrated in FIG. 2 showing the left frame side rail in progressive stages of plastic deformation as a result of an impact load imposed upon the rearward end of the frame assembly.

DETAILED DESCRIPTION OF THE PRESENTLY PREFERRED EMBODIMENT

Referring now to the drawings, wherein the presently preferred embodiment of this invention is illustrated, FIG. 1 shows a portion of a motor vehicle chassis having a chassis frame assembly 10. The frame assembly 10 includes identically constructed and symmetrically arranged left and right side rails 12 and 14. The side rails 12 and 14 are interconnected at their rearward ends by a transversely extending frame across member 16. The side rails extend in a substantially straight longitudinal direction from their rearward terminus to a point just forwardly of the rear axle 18.

The forward two-thirds of the portion of the side rails 12 and 14 between axle 18 and their rear termini have substantially uniform cross section of box shape. The rearward one-third of the rails 12, 14 are tapered and their lower edges are fluted. A series of three flutes 20, 22 and 24 is provided in each of the rearward one-third of the side rails 12 and 14. As seen in FIG. 4, the fluted rearward one-third of the left rail 12 is formed with a box-type cross sectional configuration. The comparable portion of the right rail 14 is similarly constructed.

Referring to FIG. 4, the rear portion of the left side rail 12 has side walls 23 and 25 that are interconnected along their lower edge by a bottom wall 26. The lower edge of the side walls 23 and 25 is scalloped and the bottom wall 26 is corrugated to complement the shape of the side walls 23, 25 and to form the flutes 20, 22 and 24. The box section is closed by a substantially flat upper plate 27. Due to the taper of the rearward end of the side rails 12 and 14, the distance between the depths of the flutes 20, 22 and 24 and the upper plate 27 progressively decreases.

A bumper bar 28 extends transversely across the rear of the vehicle and is connected to the frame cross member 16 by left and right energy absorbing members 30 and 32. The members 30 and 32 are box-shaped structures having four corrugated sides to facilitate collapse and the absorption of energy in the event an impact load is exerted against the bumper bar 28. The energy absorbing members 30 and 32 are connected to the frame cross member 16 in longitudinal alignment with the ends of the side rails 12 and 14.

A vehicle body and various chassis components are supported on the frame 10 in a reasonably conventional fashion. Typical sheet metal body structure is shown in FIG. 1 and indicated by reference numeral 34. A left leaf spring 36 has its forward end connected to the frame 10 by a resilient bushing (not shown) and its rearward end to the frame cross member 16 by spring hanger 38 and a shackle 40. A spring clamp (not shown) connects the axle assembly 18 to the leaf spring 36 whereby the frame 10 is supported on the axle 18.

Other equipment supported on the frame assembly 10 includes a gas tank 42 and a spare tire carrier 44. The tire carrier 44 includes a pan 46 in which a spare tire 47 is secured by a bolt and wing nut 48. The pan 46 has its rearward end bolted at 49 to a bracket supported from the frame cross member 16. A pivotal arm 50 supports the forward end of the pan 46. When the vehicle operator wishes to gain access to the spare tire 47, he removes the bolt 49 to permit the pan 46 to swing to the ground as guided by the arm 50. The wing nut 48 may be readily removed to permit withdrawal of the tire 47 from the pan 46.

OPERATION

The frame assembly 10 is constructed to support the structural load of a vehicle body in a conventional fashion. The frame assembly 10 functions as an energy absorbing device only when a load is imposed upon it that exceeds a predetermined minimum. An impact against the bumper bar 28 may constitute such a load.

In the event a forwardly directed impact load is exerted against the bumper bar 28, the frame assembly 10 and bumper supports 30 and 32 may collapse in a progressive manner to absorb the kinetic energy of the impact. The extent of collapse will depend upon the magnitude of the load exerted.

A nominal impact load against the bumper bar 28 will not cause plastic deformation of the frame 10 or the bumper supports 30 and 32. In the event the impact load is more severe, the supports 30 and 32 will collapse in the manner of a concertina whereby the kinetic energy of the impact will be absorbed. If the load is of a substantial magnitude then the bumper supports 30 and 32 and frame rails 12 and 14 will collapse in a progressive manner as shown in FIGS. 5, 6 and 7.

The initial phase of a substantial impact load will cause the bumper supports 30 and 32 to collapse linearly and thereafter the frame rails 12 and 14 will plastically deform in a bending mode. After the bumper supports 30, 32 collapse, the ends of the side rails 12 and 14 will first buckle at the rearward flutes 24 (FIG. 5). As the load upon the frame assembly 10 progresses, the rails 12 and 14 will buckle at the middle flutes 22 (FIG. 6). When the maximum level of the impact load is reached, the rails 12 and 14 will buckle about the forward flutes 20 and the frame assembly will assume the scorpioid configuration of FIG. 7. Because the vertical dimension of the side rails 12 and 14 increases progressively at the flutes 24, 22 and 20, the force required to buckle the rails in the progressive stages illustrated in FIGS. 5, 6 and 7 will increase. The gradual manner in which the frame assembly 10 is loaded prevents the buildup of a high instantaneous load upon the vehicle at the moment of the impact.

The energy absorbing frame assembly 10 of the present invention is equally appropriate for use in a vehicle having a separable frame and in one having a unitized construction where the frame members are formed of body sheet metal. Therefore, as used in the following claims, the term "frame" and the component parts thereof refer to such structures whether formed separately of or integrally with the body sheet metal.

The foregoing description presents the presently preferred embodiment of this invention. Modifications and alterations may occur to those skilled in the art that will come within the scope and spirit of the following claims.

I claim:

1. An energy absorbing frame assembly for a motor vehicle constructed to support a vehicle body,
    said frame assembly having a pair of side rails extending in a generally longitudinally direction,
    said side rails each having means providing a series of longitudinally spaced apart sections,
    each of said sections having a lower bending strength than the portions of said side rails intermediate said spaced apart sections,
    said side rails being constructed to collapse in a bending mode when a generally longitudinally directed impact load above a predetermined minimum is exerted against the ends of said side rails,
    said bending taking place at said sections of lower bending strength,
    each of said sections having a reduced vertical dimension relative to the portions of said side rails intermediate said spaced apart sections.

2. An energy absorbing frame assembly for a motor vehicle according to claim 1 and including:
    said sections of each of said series having progressively differing bending strengths whereby bending of sai side rails at said sections will occur in a consecutive manner under said impact load.

3. An enerby absorbing frame assembly for a motor vehicle according to claim 2 and including:
    said side rails being constructed to be plastically deformed to a scorpioid configuration when said impact load is above a pre-established minimum.

4. An energy absorbing frame assembly for a motor vehicle constructed to support a vehicle body,
    said frame assembly including a pair of side rails extending in a generally longitudinal direction,
    a frame cross member interconnecting the ends of said side rails,
    a bumper bar spaced from said frame cross member,
    support means interposed between said bumper bar and said frame cross member,
    said side rails each having a series of longitudinally spaced apart sections,
    each of said sections having a lower bending strength than the portions of said side rails intermediate said spaced apart sections,
    said frame assembly being constructed to absorb a generally longitudinally directed impact load above a pre-established minimum against the bumper bar by plastic deformation of the side rails in a bending mode,
    said bending occurring at said spaced apart sections of lower bending strength.

5. An enerby absorbing frame assembly for a motor vehicle constructed to support a vehicle body,
    said frame assembly including a pair of side rails extending in a generally longitudinal direction,
    a frame cross member interconnecting the ends of said side rails,
    a bumper bar spaced from said frame cross member,
    support means interposed between said bumper bar and said frame cross member,
    said side rails each having a series of longitudinally spaced apart sections,
    each of said sections having a lower bending strength than the portions of said side rails intermediate said spaced apart sections,
    said frame assembly being constructed to absorb a generally longitudinally directed impact load above a pre-established minimum against the bumper bar by plastic deformation of the side rails in a bending mode,
    said bending occurring at said spaced apart sections of lower bending strength,
    said side rails being constructed to be plastically deformed to a scorpioid configuration by said impact load.

6. An energy absorbing frame assembly for a motor vehicle constructed to support a vehicle body,
    said frame assembly including a pair of side rails extending in a generally longitudinal direction,
    a frame cross member interconnecting the ends of said side rails,
    a bumper bar spaced from said frame cross member,
    support means interposed between said bumper bar and said frame cross member,
    said side rails each having a series of longitudinally spaced apart sections,
    each of said sections having a lower bending strength than the portions of said side rails intermediate said spaced apart sections,
    said frame assembly being constructed to absorb a generally longitudinally directed impact load above a pre-established minimum against the bumper bar by plastic deformation of the side rails in a bending mode,
    said bending occurring at said spaced apart sections of lower bending strength,
    said sections of each of said series having progressively differing bending strengths whereby bending of said side rails at said sections will occur in a consecutive manner under said impact load.

7. An energy absorbing frame assembly for a motor vehicle constructed to support a vehicle body,
  said frame assembly including a pair of side rails extending in a generally longitudinal direction,
  a frame cross member interconnecting the ends of said side rails,
  bumper bar spaced from said frame cross member,
  an energy absorbing support means interposed between said bumper bar and said frame cross member,
  said side rails each having a series of longitudinally spaced apart sections,
  each of said sections having a lower bending strength than the portions of said side rails intermediate said spaced apart sections,
  said frame assembly being constructed to absorb a generally longitudinally directed impact load against the bumper bar that exceeds a predetermined minimum value by linear collapse of said bumper support means and plastic deformation of the side rails in a bending mode,
  said bending occurring at said spaced apart sections of lower bending strength.

8. An energy absorbing frame assembly for a motor vehicle according to claim 7 and including:
  said side rails being constructed to be plastically deformed to a scorpioid configuration by said impact load.

9. An energy absorbing frame assembly for a motor vehicle according to claim 7 and including:
  said sections of each of said series having progressively differing bending strengths whereby bending of said side rails at said sections will occur in a consecutive manner under said impact load.

10. An energy absorbing frame assembly for a motor vehicle constructed to support a vehicle body,
  said frame assembly including a pair of side rails extending in a generally longitudinal direction,
  a frame cross member interconnecting the ends of said side rails,
  a bumper bar spaced from said frame cross member,
  an energy absorbing support means interposed between said bumper bar and said frame cross member, said side rails each having a series of longitudinally spaced apart sections,
  each of said sections having a lower bending strength than the portions of said side rails intermediate said spaced apart sections,
  said frame assembly being constructed to absorb a generally longitudinally directed impact load against the bumper bar that exceeds a predetermined minimum value by linear collapse of said bumper support means and plastic deformation of the side rails in a bending mode,
  said bending occurring at said spaced apart sections of lower bending strength,
  each of said sections having a reduced vertical dimension relative to the portions of said side rails intermediate said spaced apart sections.

11. An energy absorbing frame assembly for a motor vehicle constructed to support a vehicle body,
  said frame assembly having a pair of side rail elements extending in a generally longitudinal direction,
  each of said rail elements having a box shape in cross section,
  said side rail elements each having means constructed to connect a vehicle bumper to one end thereof,
  said side rail elements each having means providing a series of longitudinally spaced apart sections,
  each of said sections having a lower bending strength than the portions of said side rail elements intermediate said spaced apart sections,
  the upper surface of each of said side rail elements being substantially flat,
  the lower surface of each of said side rail elements having a corrugated configuration,
  said side rail elements being constructed to collapse in a bending mode when a generally longitudinally directed impact load above a predetermined minimum is exerted against said ends of said side rail elements,
  said bending taking place at said sections of lower bending strength.

12. An energy absorbing frame assembly for a motor vehicle constructed to support a vehicle body,
  said frame assembly having a pair of side rail elements extending in a generally longitudinal direction,
  said side rail elements each having means constructed to connect a vehicle bumper to one end thereof,
  said side rail elements each having means providing a series of longitudinally spaced apart sections,
  each of said sections having a lower bending strength than the portions of said side rail elements intermediate said spaced apart sections,
  each of said side rail elements having a vertical side wall with a substantially flat upper edge and a curvilinear lower edge,
  said side rail elements being constructed to collapse in a bending mode when a generally longitudinally directed impact load above a predetermined minimum is exerted against the ends of said side rail elements,
  said bending taking place at said sections of lower bending strength.

* * * * *